July 1, 1941.   G. C. PAPENDICK   2,247,692
MEANS FOR FRACTIONATING SLICED BREAD LOAVES
Filed Nov. 25, 1938   6 Sheets-Sheet 1
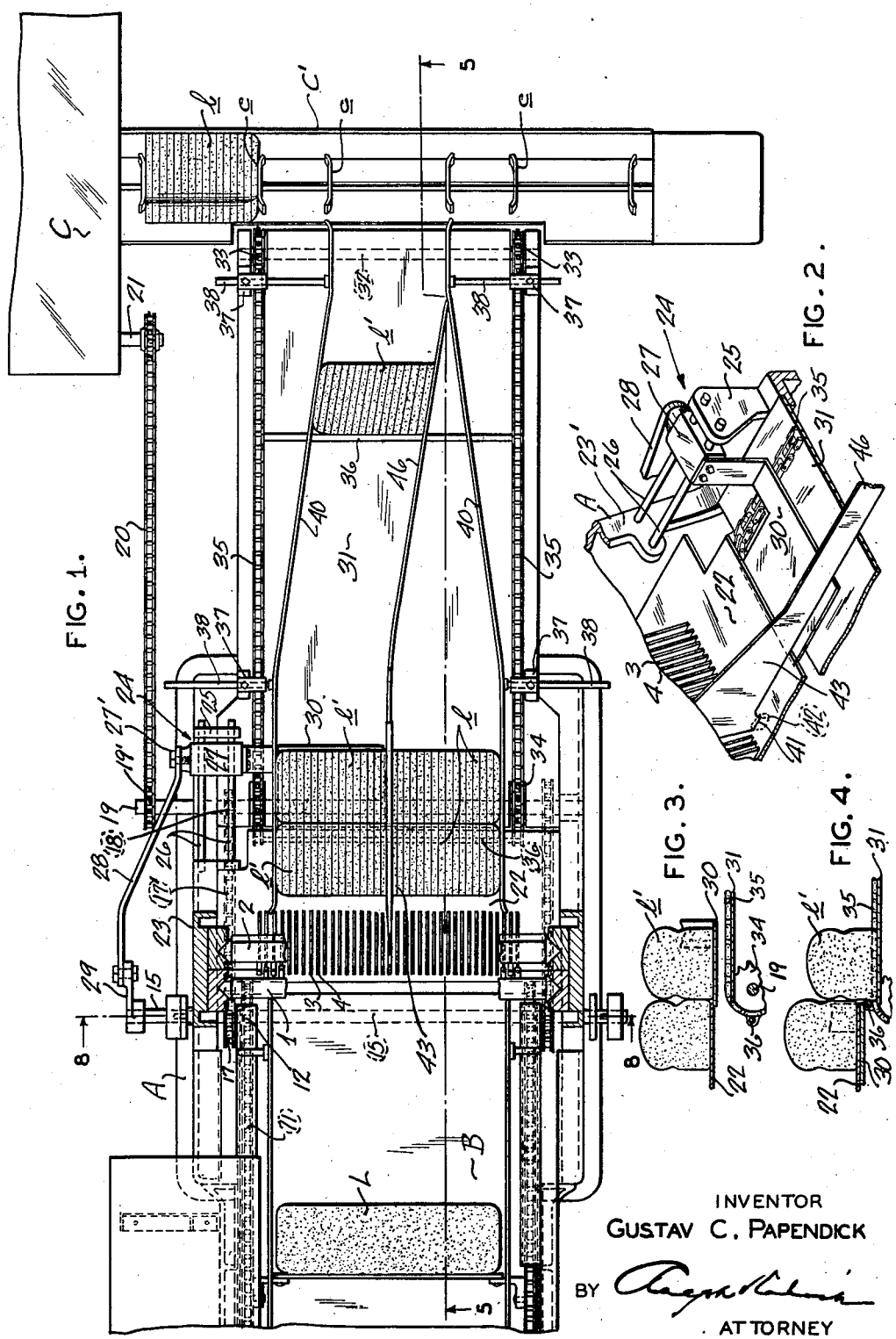
INVENTOR
GUSTAV C. PAPENDICK
BY
ATTORNEY July 1, 1941.　　　G. C. PAPENDICK　　　2,247,692
MEANS FOR FRACTIONATING SLICED BREAD LOAVES
Filed Nov. 25, 1938　　　6 Sheets-Sheet 2
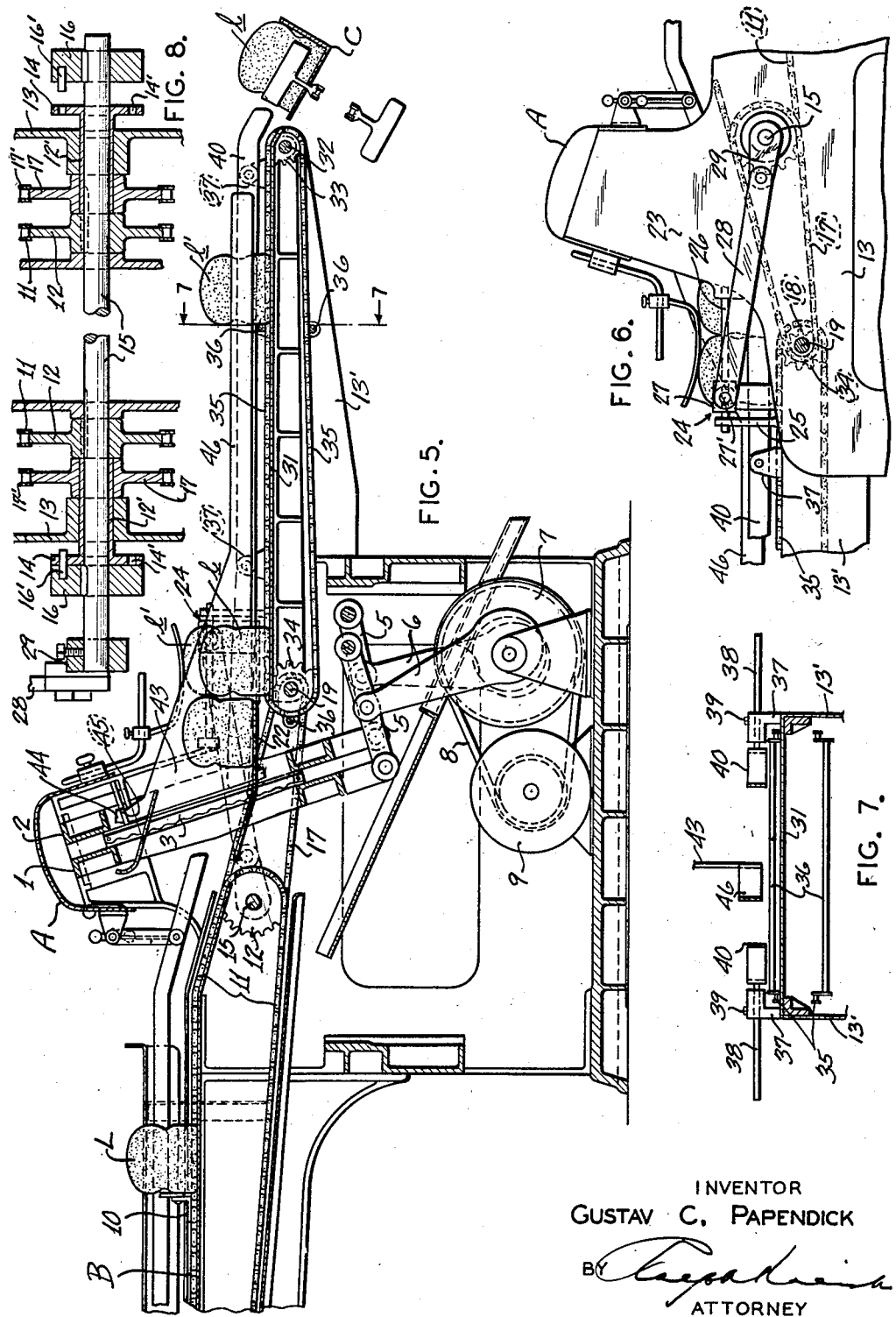
INVENTOR
GUSTAV C. PAPENDICK
BY
ATTORNEY July 1, 1941.    G. C. PAPENDICK    2,247,692
MEANS FOR FRACTIONATING SLICED BREAD LOAVES
Filed Nov. 25, 1938    6 Sheets-Sheet 4

INVENTOR
GUSTAV C. PAPENDICK
BY
ATTORNEY

July 1, 1941.  G. C. PAPENDICK  2,247,692
MEANS FOR FRACTIONATING SLICED BREAD LOAVES
Filed Nov. 25, 1938  6 Sheets-Sheet 5

INVENTOR
GUSTAV C. PAPENDICK
BY
ATTORNEY.

July 1, 1941. G. C. PAPENDICK 2,247,692
MEANS FOR FRACTIONATING SLICED BREAD LOAVES
Filed Nov. 25, 1938 6 Sheets-Sheet 6

INVENTOR
GUSTAV C. PAPENDICK
BY
ATTORNEY

Patented July 1, 1941

2,247,692

UNITED STATES PATENT OFFICE 2,247,692

MEANS FOR FRACTIONATING SLICED BREAD LOAVES

Gustav C. Papendick, University City, Mo.; Elizabeth Papendick executrix of Gustav C. Papendick, deceased, assignor to Papendick, Inc., St. Louis, Mo., a corporation of Missouri Application November 25, 1938, Serial No. 242,430

22 Claims. (Cl. 146—153)

This invention relates to certain new and useful improvements in methods and means for fractionating sliced bread-loaves, and has for its primary object the provision not only of a method for the fractionating of sliced bread-loaves which is exceptionally speedy, efficient, and economical, but also of means which will automatically sub-divide respective sliced bread-loaves into a plurality of fractions in a simple, speedy, and efficient manner without materially adding to the production cost of the bread-loaves, which will fractionate or sub-divide the bread-loaves at high speed in timed relation to the other bread production processes, and which will provide the consumer trade with tasty and fresh bread-loaves, which may, if desired, be so wrapped or packaged for direct visual inspection.

And with the above and other objects in view, my invention resides in the novel features of form, construction, arrangement, and combination of parts presently described and pointed out in the claims.

In the accompanying drawings (six sheets)—

Figure 1 is a top plan view of a sliced bread-loaf fractionating machine constructed in accordance with and embodying my present invention;

Figure 2 is a fragmentary detail perspective view of one form of separator plate forming a part of my present invention;

Figure 9:
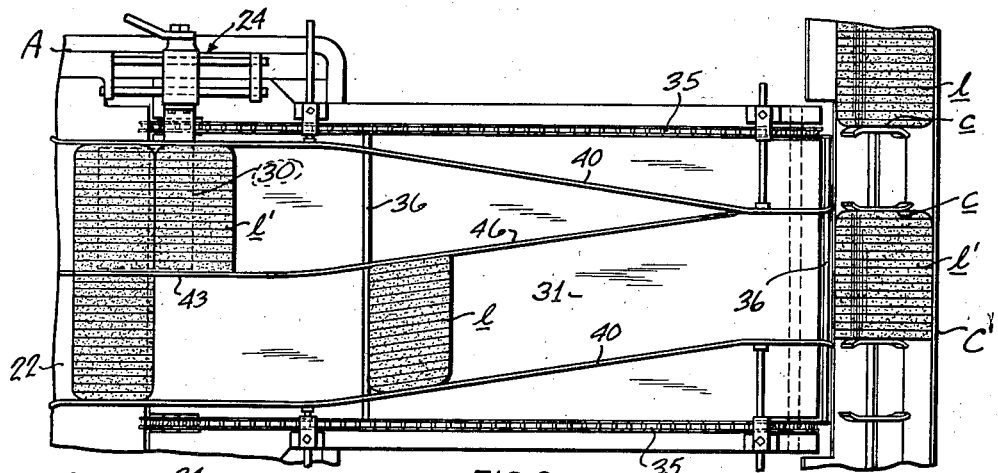
Figure 10:
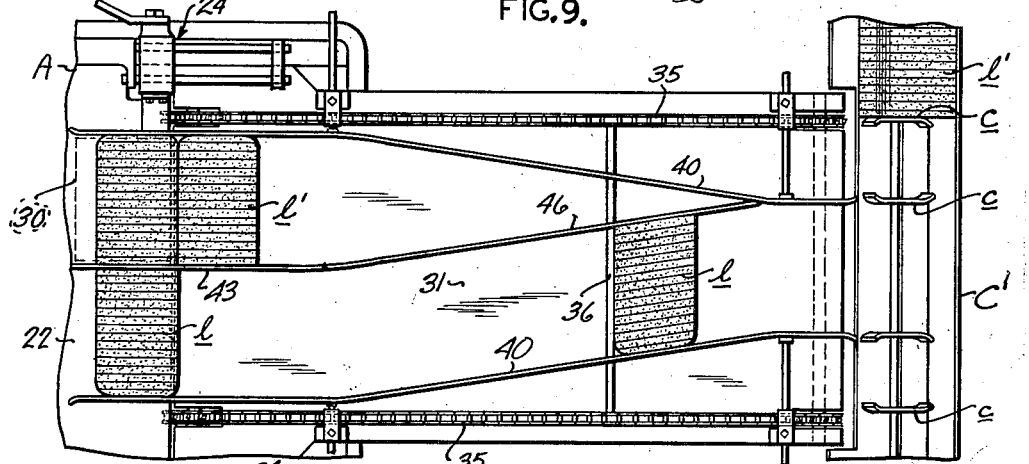
Figure 11:
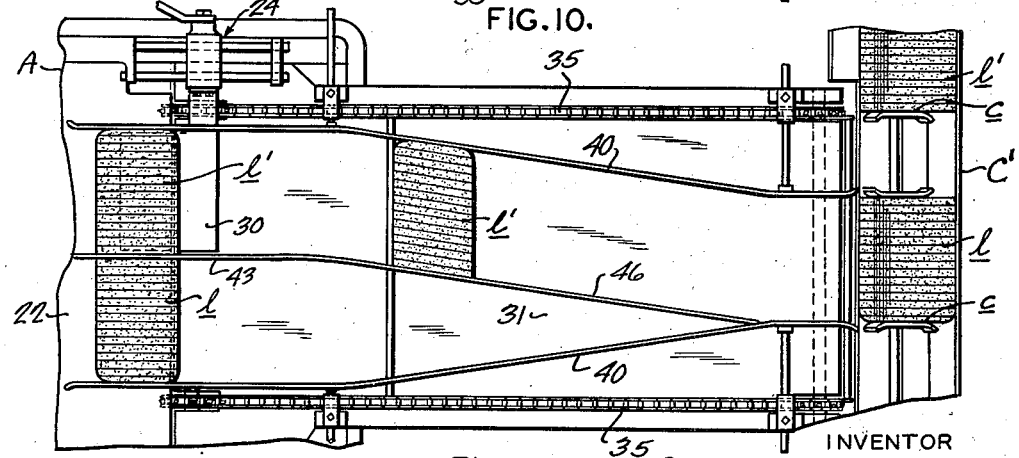
Figure 12:
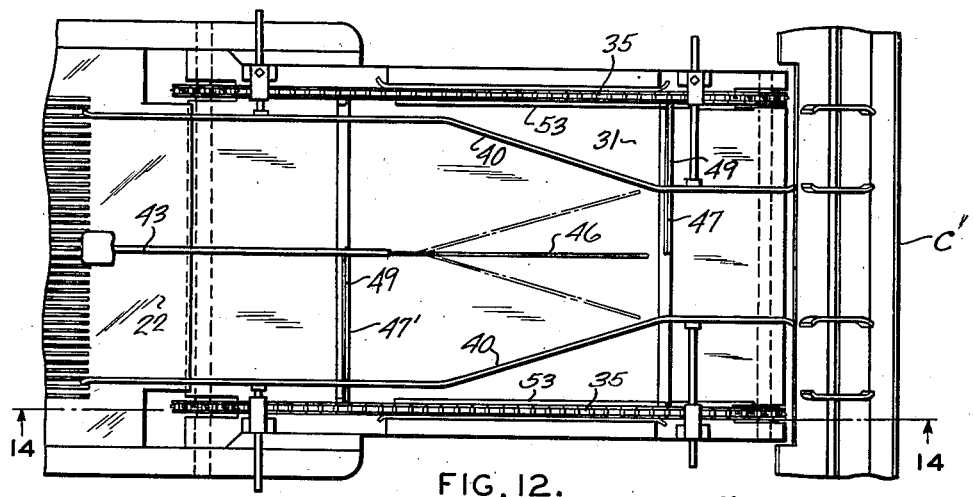
Figure 13:
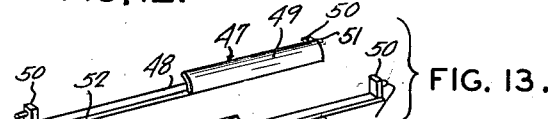
Figure 14:
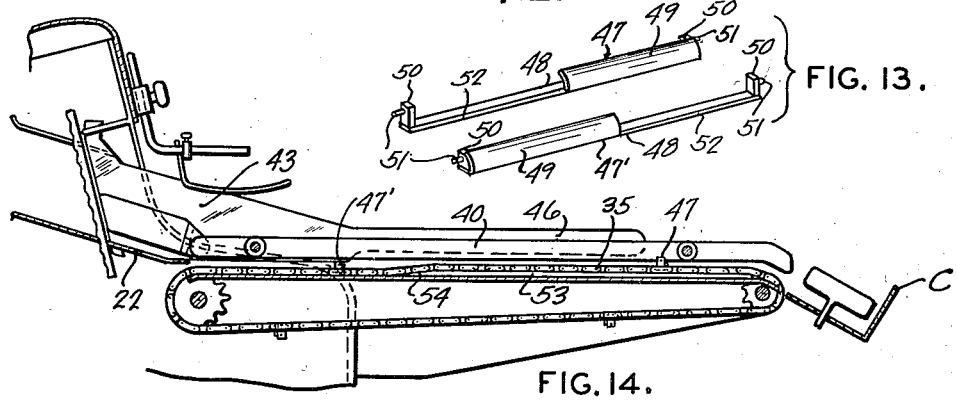
Figure 15:
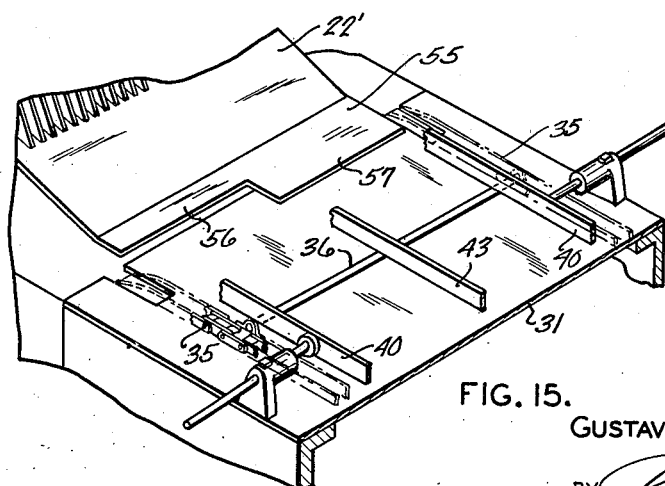
Figure 16:
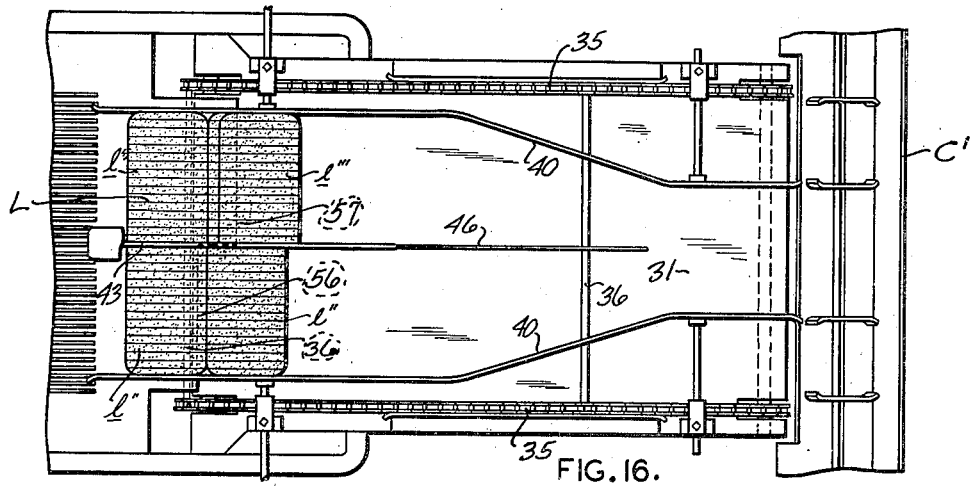
Figure 17:
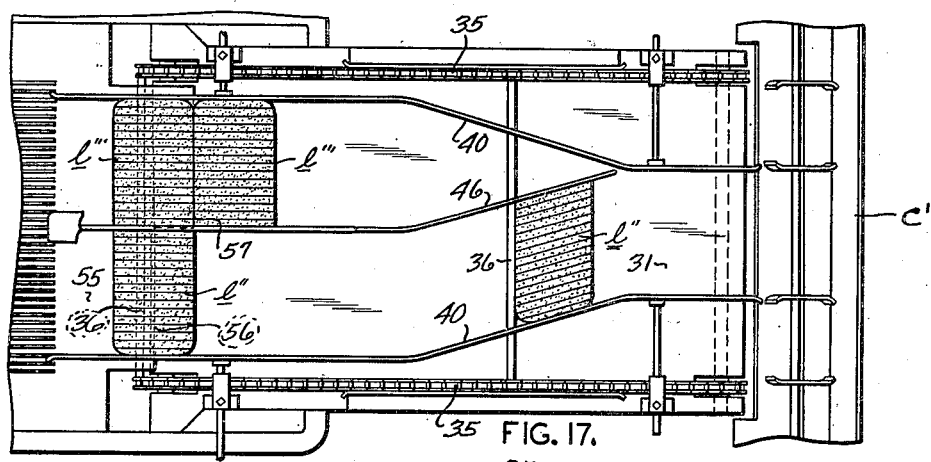
Figure 18:
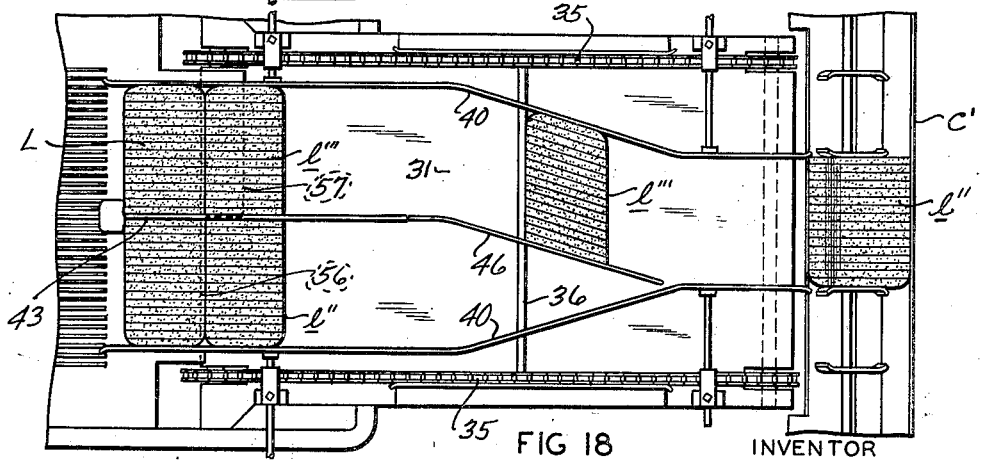
Figure 19:
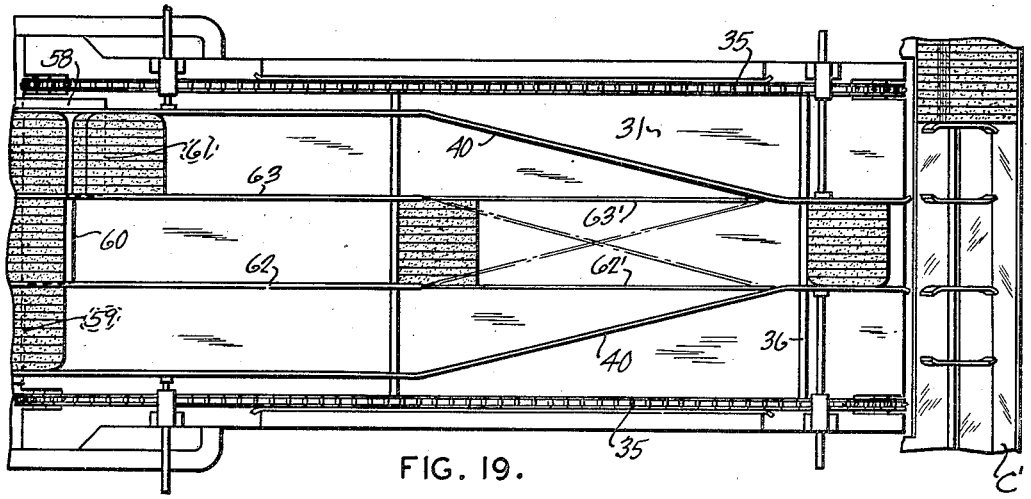
Figure 20:
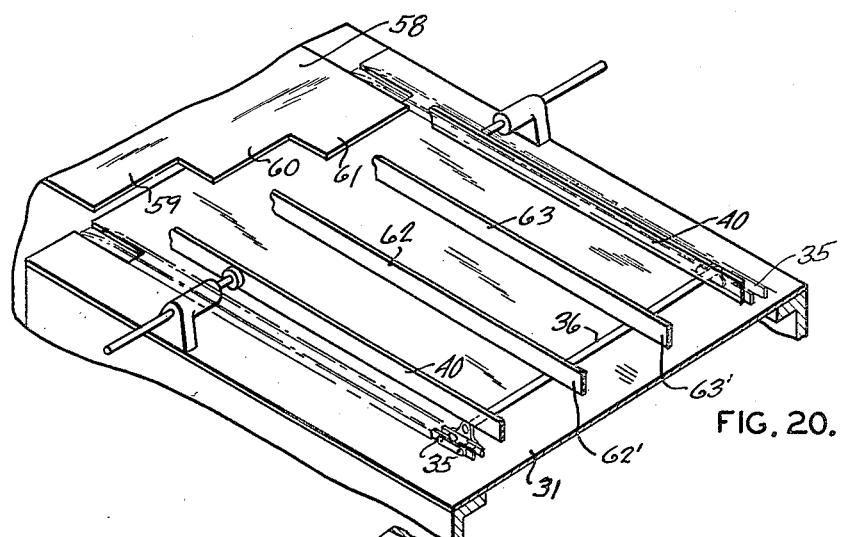
Figure 21:
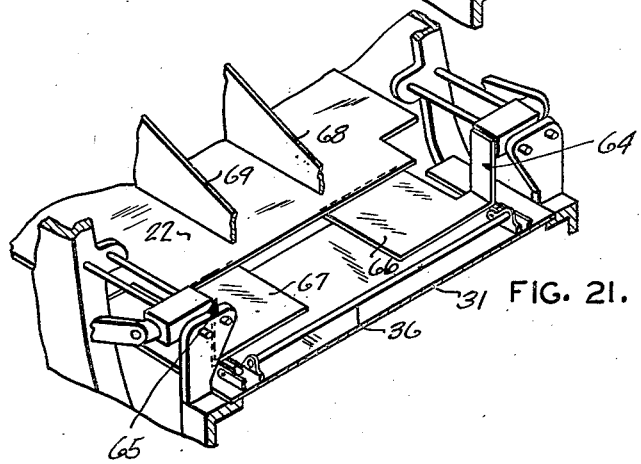

Figures 3 and 4, respectively, are fragmentary vertical sectional views of the separator plate in the two extreme positions of its operation;

Figure 5 is a sectional view of the sliced loaf fractionating machine, taken approximately along the line 5—5, Figure 1;

Figure 6 is a fragmentary elevational view of the separator plate actuating mechanism forming a part of my present invention;

Figure 7 is a transverse sectional view of the sliced loaf fractionating machine, taken approximately along the line 7—7, Figure 5;

Figure 8 is a fragmentary transverse sectional view of the separator plate actuator drive mechanism, taken approximately along the line 8—8, Figure 1;

Figures 9, 10, and 11 are diagrammatic top plan views of the sliced loaf fractionating means in various stages of loaf fractionating operation;

Figure 12 is a fragmentary top plan view of a modified form of loaf fractionating means;

Figure 13 is a perspective view of a modified form of flight-bar which may be optionally used with the modified form of fractionating means;

Figure 14 is a fragmentary sectional view of the modified form of loaf fractionating means, taken approximately along the line 14—14, Figure 12;

Figure 15 is a fragmentary perspective view of the modified form of fractionating means;

Figures 16, 17, and 18 are diagrammatic top plan views of the modified form of loaf fractionating means in various stages of loaf fractionating operation;

Figure 19 is a top plan view of a second modified form of loaf fractionating means;

Figure 20 is a fragmentary perspective view of the second modified form of loaf fractionating means; and Figure 21 is a fragmentary perspective view of a modified form of reciprocatory separator plate of my present invention.

Referring now in more detail and by reference characters to the drawings, which illustrate preferred embodiments of my present invention, A designates a loaf slicing machine which includes a pair of vertically reciprocable knife frames 1, 2, each having a plurality of spaced parallel knife blades 3, 4, the frames 1, 2, being operably connected for reciprocating actuation through link members 5 and connecting rods 6 to a pulley-type fly-wheel 7, which is, in turn, operably connected, as by means of a belt 8, to a suitable prime mover, such as an electric motor 9.

Mounted forwardly of the slicing mechanism proper, is a loaf-feeding conveyer B preferably of the chain-driven flight type and including a plurality of pusher flights 10 operatively mounted on and extending between parallel sprocket chains 11 trained over sprockets 12. Rotatively mounted in and extending through the side frames 13 of the slicing machine A are axially aligned short tubular shafts or quills 12' integrally provided on their extended ends with indexing-disks 14 each having an annular series of apertures 14'. Rotatively mounted in and extending through the tubular shafts or quills 12' is a drive shaft 15 for drivingly supporting the sprockets 12. Shiftably keyed on the extended ends of the shaft 15 are indexing wheels 16 each having an axially projecting pin 16' for retentive driving engagement in a selected aperture 14'. Keyed on the quills 12', are sprockets 17, in turn, connected by means of an intermediate drive chain 17' to drive sprockets 18 fixed upon a transfer conveyer drive shaft 19 also operatively journaled in the side frames 13 and provided at its outer end with a sprocket 19', over which is trained a main drive chain 20, whereby the main drive shaft 19 is driven from a rotating shaft 21 directly connected in any conventional manner to the main driving mechanism of the wrapping machine C, all as best seen in Figure 1 and for purposes presently more fully appearing. In this connection, it should be pointed out that one of the sprockets 17 bears a two to one tooth ratio with respect to its associated drive sprocket 18, whereas the other sprocket 17 bears a one to one tooth ratio with respect to its drive sprocket 18. Thus it will be evident that, by optionally engaging one or the other of the indexing wheels 16 with its associated indexing disk 14, the low feeding conveyor B may be driven at either the same or twice the speed of the flight rods 36. Furthermore, when both of the indexing wheels 16 are disengaged, the shaft 15 may be freely rotated to readjust the timed relation between the conveyor B, the flight rods 36, and associated mechanism.

Rigidly mounted on, and extending horizontally between, the side frames 13 of the slicing machine A, is a receiving plate 22 positioned on the discharge side of the slicing frames 1, 2, for receiving the sliced bread loaves. Adjustably mounted on the slicer-head frame-work 23, is a conventional hold-down plate assembly 24 for abutting engagement with the upwardly presented surface of the sliced bread-loaf as it issues onto the receiving plate 22 for preventing accidental upward displacement of the slices, as best seen in Figure 5 and for purposes presently more fully appearing.

Mounted at their ends respectively on and disposed horizontally between an upstanding bracket 25 and one of the vertical post members 23' of the slicer-head 23 is a pair of parallel rods 26 spaced upwardly from and extending along the upper margin of a side frame 13. Slidably mounted on the rods 26 is a shiftable block 27 provided at its outer end with a bearing stud 27' for rotatory connection with one end of a link 28, which is, in turn, at its other end rotarily connected to a crank arm 29, the latter being keyed upon the extended end of the feed conveyer drive shaft 15 for rotation therewith. Mounted on the inner end of the block 27 for reciprocation therewith, is a separator plate 30 positioned for slidable movement just beneath the receiving plate 22 and having a width slightly greater than the width of a bread-loaf, so that a bread-loaf will rest fully thereon when the plate is in outwardly extended position, as shown in Figure 3.

The separator plate 30 further, as shown, extends transversely across beneath the receiving plate 22, terminating at substantially the mid-point thereof for separating the sliced bread loaf into two equal fractions or halves, although, it will be clearly understood that this separator plate 30 may be lengthened or shortened for the purpose of sub-dividing the bread-loaf into unequal fractions or duplicated a plurality of times, depending upon the number of fractions into which the loaf is to be divided, as will be presently more fully discussed. It will, of course, be evident that as the feed conveyer drive shaft 15 is rotated, the separator plate 30 will be reciprocated in a horizontal plane below the receiving plate 22 from extended position, as shown in Figure 3, to retracted position, as shown in Figure 4 and for purposes presently more fully appearing.

Extending forwardly from the discharge end of the slicing machine A above the main drive shaft 19 and rigidly supported along its side margins in the side frame extensions 13', is a transfer conveyer table 31 spaced substantially below the under face of the separator plate 30.

Journaled at its ends in the side frame extensions 13' and extending beneath the conveyer table 31 adjacent the outer end thereof, is an idle shaft 32 provided with a pair of spaced sprockets 33 in peripheral alignment with two similar spaced sprockets 34 rigidly mounted on the main shaft 19. Trained over each of the aligned sprockets 33, 34, are parallel flight chains 35 provided with a plurality of spaced, parallel, preferably rod-like flight-bars 36, each operatively mounted at its ends in the chains 35 for movement in a continuous series across the upper face and over the outer end of the conveyer table 31, thence backwardly beneath and forwardly over the inner end thereof through the space between the under face of the separator plate and the upper face of the conveyer table 31, for purposes presently more fully appearing and as best seen in Figure 5.

Each of the side frame extensions 13' is provided on its upwardly presented face, and preferably adjacent either end, with transversely apertured bosses 37 for slidably receiving the side-guide supporting rods 38 mounted therein for transverse shiftable movement to any desired position of adjustment, in which adjusted position they may be held by the set screws 39. Rigidly mounted on the inner ends of the rods 38, are oppositely shaped companion side-guides 40 spaced upwardly from and extending at one end adjacent to and parallel with a longitudinal margin of the conveyer table 31 and being then bent inwardly toward, and extending angularly for a substantial distance across, the conveyer table 31, being finally bent forwardly for extension parallel to the longitudinal margin of the conveyer table 31, and further being spaced transversely apart at the inner end of the transfer conveyer table 31 by a distance equal to the full width of the loaf and at the outer end of the conveyer table 31 adjacent the wrapping machine conveyer mechanism C' by a distance equal to the length of the loaf fraction, as best seen in Figure 1.

The receiving plate 22 is centrally provided with a slot or aperture 41 for receiving the downwardly projecting ear 42 of a somewhat triangularly shaped divider plate 43, which is also provided with an upwardly projecting ear 44 removably engageable in a recess 45 formed in the upper portion of the framework of the slicer A in alignment with the plate aperture 41 for holding the divider strip 43 in vertically upright position, as best seen in Figures 1 and 2. Formed preferably as an integral extension of the divider strip 43 and extending forwardly therefrom above and across the conveyer table 31, is a free-swinging separator strip 46 preferably having a length substantially equal the length of the angular portion of the side-guides 40, as best seen in Figure 1 and for purposes presently more fully appearing.

As has been above pointed out, the separator plate 30 is reciprocated in a predetermined timed relation with both the transfer and feed conveyer. Furthermore, as has been above pointed out, for purposes of illustration a half-loaf fractionating mechanism has been described. Hence the flight-bars 36 move forwardly at twice the lineal speed of the feed conveyer mechanism. Thus, as the bread-loaves L are progressed through the slicing knives, a particular loaf will move outwardly on the receiving plate 22 and be divided into two half fractions $l$, $l'$, by the divider strip 43. As the divided loaf continues forwardly, one half or fraction $l$ of the loaf will fall directly down upon the surface of the transfer conveyer table 31, whereas the other half $l'$ will move onto the separator plate 30. As the first half $l$ falls upon the transfer conveyer, one of the flight bars 36 will be moved upwardly from beneath the conveyer table into engagement with the loaf section, and progress it rapidly at accelerated speed across the conveyer table 31 between the side-guides 40 and the separator strip 46, which will bend or swing freely into parallelism with the side-guide 40 and yet possess sufficient stiffness to bear lightly against the crustless end slice for preventing the slices from falling over as the loaf fraction $l$ is progressed forwardly, as best seen in Figure 9.

Meanwhile the second fraction $l'$ of the bread-loaf will have been pushed somewhat forwardly across the separator plate but is still held retentively thereby. As the first bread-loaf fraction $l$, which is already moving across the transfer conveyer table 31, has progressed forwardly out of the way of the second loaf fraction $l'$ to the position shown in Figure 10, the separator plate 30 will reach the rearward limit of its reciprocatory movement beneath the receiving plate 22 and the second fraction $l'$ will drop down upon the transfer conveyer table 31 just as the next succeeding flight-bar 36 comes up from beneath the table 31 and starts moving forwardly thereacross. The second fraction $l'$ will now be rapidly progressed between the other side-guide 40 and the divider strip 43 by this next succeeding flight-bar 36, coming abreast of the angular section of the side-guides 40 just as the first fraction $l$ enters the narrow sections between the side-guides 40, at the discharge end of the conveyer table 31. The separator strip 46 then swings freely back into parallelism with the opposite side-guide 40 for engagement with the crustless end face of the succeeding loaf fraction $l'$, as best seen in Figure 11. Thus, the loaf fractions will be delivered in a continuous consecutive series at the discharge end of the transfer conveyer table 31 into the so-called pockets $c$ of the wrapping machine conveyer C', which are moved intermittently in the conventional manner by a Geneva movement or other drive means (not shown), each pocket being brought to rest momentarily in front of the discharge ends of the side-guides 40, as shown in Figure 1, for receiving a loaf fraction and progressing it into the wrapping machine for conventional handling.

In lieu of the reciprocatory separator plate 30 and the flight-bars 36, I may provide a plurality of pairs of cut-away flight-bars 47, 47', each including a thin, flat bar 48 integrally provided along half the length of its forward margin with an upstanding preferably arcuate flange 49 and at either end with upstanding blocks 50, each, in turn, having an outwardly projecting pin 51 for engagement with the chains 35. Along the remainder of their forward margins the flights 47, 47', are beveled off in the provision of a downwardly and forwardly extending chamfer 52, all as best seen in Figure 13.

Rigidly mounted on the upper face and extending parallel to the longitudinal margins of the conveyer table 31 from a point opposite the inward bend of the guides 40 to the discharge end thereof beneath the upper horizontal runs of each of the chains 35, is a narrow lift-track 53 provided at its rearward end with an inclined section 54, all as best seen in Figures 12 and 14 and for purposes presently more fully appearing.

As each sliced bread-loaf L progresses from the slicing knives onto the receiving plate 22 it will be divided at a slice cut by the divider strip 43 and will move over the edge of the receiving plate 22 upon the table 31. As the cut-away flight-bar 47 comes up from beneath the table 31, the upstanding pusher flange 49 will engage one half section of the loaf L and progress it forwardly at accelerated speed. The other half section of the loaf, however, will ride up over the beveled edge 52 of the flight-bar 47 and be left behind, so to speak. As the flight-bar 47 passes beneath the angularly bent portions of the side-guides 40 and the loaf fracton begins to shift axially, the flight-bar 47 will ride up on the lift track 53 so that it will become effective throughout its length in progressing the loaf fraction. The companion flight-bar 47', having its pusher flange in alignment with the bevel edge 52 of the bar 47 and following in spaced relation thereto, will engage and progress the remaining loaf section.

Instead of the reciprocating plate 30, I may also provide a receiving plate 22' preferably integrally provided with a so-called "step-plate" 55, projecting horizontally forwardly from, and being of substantially the same transverse width as, the receiving plate 22. From its one side margin to its center line, the plate 55 is relatively narrow and from its center line to its other side margin relatively wide in the provision of a narrow step-section 56 and a wide step-section 57, the latter preferably, though not necessarily, being twice as wide as the narrow step-section 56, all as best seen in Figure 15.

As the sliced loaf L progresses from the slicer knives across the receiving plate 22 and is split at a slice cut by the divider plate 43 into loaf fractions $l''$, $l'''$, as shown in Figure 16, the loaf fraction $l''$ will drop over the edge of the narrow step-section 56 in front of the oncoming flight-rod 36 and be progressed rapidly toward the discharge end of the conveyer table 31 between the guides 40, 46, as above described. The other loaf fraction $l'''$, on the other hand, being on the wide step-section 57, will be held up from the conveyer table for a short period longer, allowing the flight-rod 36 to pass freely therebeneath. By the time the loaf fraction $l''$ has progressed over the wide step-section 57 under the influence of the succeeding loaves L, the first loaf $l''$ and the flight-rod 36, by which it is moved, will have been progressed forwardly out of the way and the thus delayed loaf section $l'''$ will drop down in front of the next succeeding flight-bar 36 for movement toward the discharge end of the conveyer table in rearwardly spaced succession with respect to the loaf fraction $l''$, as seen in Figure 17.

At this moment, the next succeeding loaf L, however, will just be starting across the step-plate 55, so that the loaf fraction $l'''$ of the first-mentioned loaf will be progressed to the position shown in Figure 18 by the time the loaf fraction $l''$ of the succeeding loaf drops down upon the conveyer table 31.

As has been pointed out above, the loaf may be divided into a plurality of sections, if desired. For instance, if it be desired to fractionate the loaf in thirds, I may provide a step-plate 58 having three equal step-sections 59, 60, 61, of respectively increasing width, as best seen in Figure 20. Positioned over the lateral margins, respectively, of the step-sections 60, 61, are divider strips 62, 63, having flexible end strips 62', 63', substantially identical with the divider strip 43. As will be understood by reference to Figure 19, the sliced bread-loaf will be split into thirds by the divider strips 62, 63, and the fractions will successively drop onto the conveyer table 31 for movement thereacross in successively spaced relation.

Similarly, for dividing the loaves into three fractions, I may provide two reciprocating plate assemblies 64, 65, arranged on opposite sides of the machine, and being substantially identical in construction and operation with the reciprocating plate 30, above described, except that the plate members 66, 67, thereof have a length corresponding to the length of the particular loaf fraction passing thereover. Furthermore, two divider strips 68, 69, identical in structure and function with the above described strips 62, 63, are provided for loaf-splitting and guiding co-operation with the reciprocating plates 66, 67, all as best seen in Figure 21.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is—

1. In a bread loaf slicing and fractionating machine, a transfer conveyer having a plurality of lengthwise extending inwardly bent side guides, a plurality of driven flights for progressing baked loaf fractions over the conveyer, and swingable intermediate guide means for urging the respective fractions into endwise engagement with one or the other of said guides.

2. The method of fractionating baked bread-loaves which comprises passing the loaves in a continuous series through a slicing mechanism for slicing operation, sub-dividing the sliced loaves into a plurality of fractions at a slice cut as the slice cut is being formed, successively shifting said fractions forwardly at accelerated speed out of axial alignment with each other, and subsequently axially shifting said fractions for bringing the same into consecutive alignment one behind the other.

3. In a baked loaf fractionating machine, means for sub-dividing the sliced loaves into fractions and shifting the loaf fractions into consecutive alignment, said means including a pair of companion-shaped side-guides and an intermediate guide free at one end and fixed at the other end between the side-guides and being flexible intermediate its ends and having a length sufficient for optional swinging movement toward and endwise abutting engagement with either of the side guides at its free end.

4. In a sliced-loaf fractionating machine, a conveyer having a plurality of spaced flights each being cut away along a portion of its length for passing freely beneath a fractional portion of the sliced loaf.

5. In a sliced-loaf fractionating machine, a conveyer having a plurality of spaced flights each having a relatively thin section for passing beneath one fractional portion of the sliced loaf and an upstanding portion for gripping and progressing another fractional portion of the loaf.

6. A commodity packaging machine comprising means for subdividing the commodity into a plurality of fractions, shifting means for successively progressing the several fractions initially along separate paths of movement, and means cooperatively engaging said fractions during movement by the shifting means for translating the fractions axially toward a common path for successive delivery in consecutive series.

7. In a baked loaf fractionating machine, loaf slicing means, means for subdividing the sliced loaf into fractions, means for advancing the several fractions of the loaf successively one with respect to the other in timed relation to the operation of the slicing means, and means for shifting the loaf fractions into tandem alignment while maintaining the advance spacing therebetween substantially constant.

8. In a loaf fractionating machine, conveyer means for progressing the loaves, loaf fractionating means comprising a horizontally reciprocable intermittently stationary plate disposed above the conveyer and adapted to receive and support a selected fraction of each loaf and delay the forward movement thereof, and plate driving means operable in timed relation to the movement of the conveyer means for positively shifting the plate out of supporting engagement with the delayed fraction whereby to release and deposit such delayed fraction upon the conveyer means.

9. A bread loaf slicing and fractionating machine comprising, in combination, loaf-slicing means, a feed conveyer adapted to progress bread loaves to and through the slicing means, a transfer conveyer for moving the sliced loaves away from the slicing means, and means interposed between the slicing means and the transfer conveyer for fractionating the sliced loaves, said means including a horizontally reciprocable plate driven in timed relation to the movement of the feed conveyer.

10. In a bread loaf slicing and conveying machine including a feed conveyer, slicing means, and a transfer conveyer, a loaf fractionating mechanism including an intermittently stationary plate disposed above the conveyer and mounted for reciprocation longitudinally of the transfer conveyer, and means for driving the plate in timed relation to the feed conveyer for positively shifting the plate out of supporting engagement with the delayed fraction whereby to release and deposit such delayed fraction upon the conveyer means.

11. In a sliced loaf fractionating machine, a conveyer having a plurality of spaced flights each being cut away along a portion of its length for passing freely beneath a fractional portion of the sliced loaf, and track means extending longitudinally along a portion of the path of movement of the flights for lifting the flights for movement in a plane spaced from the plane of initial movement.

12. In a sliced loaf fractionating machine, a conveyer table, a plurality of spaced flights adapted for movement across the table each being cut away along a portion of its length for passing freely beneath a fraction of the sliced loaf, and track means mounted on the table and extending longitudinally along a portion of the path of movement of the flights for lifting the flights upwardly from the table during a portion of travel thereacross.

13. In a sliced loaf fractionating machine, a conveyer table, a pair of side guides having opposed parallel sections and opposed oblique sections, a plurality of spaced flights each being cut away along a portion of its length for passing freely beneath a fractional portion of the sliced loaf, and lift track means mounted on and extending longitudinally along a portion of the table over which the oblique side guides extend for causing the flights to move in a plane spaced upwardly from the table while passing beneath the oblique section of the side guides.

14. In a baked loaf fractionating machine, loaf slicing means, means for moving the sliced loaf along an initial path having a width substantially equal to the length of an entire loaf, means for sub-dividing the sliced loaf into fractions, means for successively progressing the fractions along a second path angular to the longitudinal axis of the loaf, and means for shifting the fractions of the loaf into consecutive alignment during movement along said path for subsequent movement along a third path having a width substantially equal to the length of a loaf-fraction.

15. In a baked loaf fractionating machine, a loaf slicer having means associated therewith, means for sub-dividing the sliced loaf into fractions, means operable in timed relation to the slicer-feeding means for progressing the fractions of the loaf longitudinally of the machine in successive order, and means for shifting the fractions of the loaf coincidental with such progress into consecutive alignment one behind the other.

16. A bread-loaf slicing and fractionating machine comprising, in combination, loaf slicing means, a transfer conveyer for moving the sliced loaves forwardly away from the slicing means, and means interposed between said slicing means and conveyer for fractionating each loaf independently of succeeding loaves, said means including means operable in timed relation to the movement of the conveyer for delaying a predetermined fraction of the loaf for solitary disposition upon the conveyer in rearwardly spaced relation to the other fractions of the particular loaf and forwardly of the succeeding loaves.

17. A bread loaf slicing and fractionating machine comprising, in combination, loaf slicing means, a transfer conveyer for moving the sliced loaves forwardly away from the slicing means, means interposed between said slicing means and conveyer for fractionating each loaf independently of succeeding loaves, said means including means operable in timed relation to the movement of the conveyer for delaying a predetermined fraction of the loaf for solitary disposition upon the transfer conveyer in rearwardly spaced relation to the other fractions of the particular loaf and forwardly of succeeding loaves, and means cooperatively related with the transfer conveyer for gripping each individual loaf-fraction and holding the same in upright position during movement by the transfer conveyer.

18. The method of fractionating baked bread-loaves which comprises passing the loaves in a continuous series through a slicing mechanism in a predetermined direction for slicing operation, sub-dividing the sliced loaves into a plurality of fractions, successively progressing the fractions of each loaf in said predetermined direction at accelerated speed for shifting the several fractions into non-axial spaced relationship with respect to each other, and subsequently shifting said fractions for bringing the same into consecutive alignment.

19. The method of fractionating baked bread-loaves which comprises passing the loaves in a continuous series through a slicing mechanism in a predetermined direction for slicing operation, sub-dividing the sliced loaves into a plurality of fractions, successively progressing the fractions of each loaf in said predetermined direction at accelerated speed for shifting the several fractions into non-axial spaced relationship with respect to each other, and subsequently shifting said fractions toward a common path for successive delivery to a wrapping machine conveyer.

20. In a sliced bread loaf-fractionating machine a conveyer table having a receiving end and a discharge end, and a plurality of pusher elements movable across the table from the receiving end to the discharge end in spaced relation one behind the other, said elements being arranged in complementary sets each element within the set being provided with uniquely positioned means for engaging and progressing a different fractional portion of a bread loaf for separating the loaf into a staggered series of spaced fractions.

21. In a sliced bread loaf-fractionating machine a conveyer table having a receiving end and a discharge end, a plurality of pusher elements movable across the table from the receiving end to the discharge end, said elements being arranged in complementary sets each element within the set being provided with uniquely positioned means for engaging and progressing a different fractional portion of a bread loaf for separating the loaf into a staggered series of spaced fractions, loaf guiding means disposed obliquely along the table for shifting the fractions lengthwise along the pusher elements during progressive movement thereby for moving the fractions into spaced alignment one behind the other, and means effective during said shifting movement for vertically translating the loaf fraction and its associated pusher element relatively to each other for maintaining fraction-progressing engagement between said pusher and said fraction.

22. In a baked loaf-fractionating machine, means for subdividing the sliced loaves into fractions and shifting the fractions into consecutive alignment, said means including a pair of converging side guides and an intermediate guide swingable about a point located approximately between the wide-spaced ends of the converging guides and having a length substantially equal to the length of the converging portions of the side guides for optionally maintaining a parallel-sided enclosed trackway with either of the side guides.

GUSTAV C. PAPENDICK.